US 7,538,664 B2

(12) United States Patent
Dorgelo et al.

(10) Patent No.: US 7,538,664 B2
(45) Date of Patent: May 26, 2009

(54) CUSTOMIZED INDUSTRIAL ALARMS (75) Inventors: Eric G. Dorgelo, Port Moody (CA);
Kenwood H. Hall, Hudson, OH (US);
David K. Johnson, Waukesha, WI (US);
Jan Bezdicek, Prelouc (CZ); Charles Martin Rischar, Chardon, OH (US);
Dale Robert Sapach, Roberts Creek (CA); John J. Baier, Mentor, OH (US);
Kevin Michael Tambascio, Lyndhurst, OH (US); Daniel Cernohorsky, Hradec Kralove (CZ)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 288 days.

(21) Appl. No.: 11/537,261

(22) Filed: Sep. 29, 2006

(65) Prior Publication Data
US 2008/0079558 A1  Apr. 3, 2008

(51) Int. Cl.
*G08B 29/00* (2006.01)
*G08B 1/08* (2006.01)
(52) U.S. Cl. ............ 340/506; 340/539.18; 340/531
(58) Field of Classification Search ........... 340/506, 340/539.18
See application file for complete search history.

(56) References Cited

U.S. PATENT DOCUMENTS

| 6,147,601 | A | 11/2000 | Sandelman et al. |
| 6,661,340 | B1* | 12/2003 | Saylor et al. ............... 340/517 |
| 6,703,930 | B2* | 3/2004 | Skinner ............... 340/539.11 |
| 6,889,096 | B2 | 5/2005 | Spriggs et al. |
| 7,088,240 | B2* | 8/2006 | Inata et al. ............. 340/539.18 |
| 2003/0023340 | A1 | 1/2003 | Kitamoto et al. |
| 2003/0025599 | A1* | 2/2003 | Monroe ..................... 340/531 |
| 2004/0172147 | A1 | 9/2004 | Dillon |
| 2006/0136583 | A1 | 6/2006 | Helmstetter et al. |
| 2006/0190584 | A1 | 8/2006 | Skold et al. |

FOREIGN PATENT DOCUMENTS

| DE | 19962230 A1 | 6/2001 |
| EP | 1562090 A | 8/2005 |

OTHER PUBLICATIONS

European Search Report dated Jan. 15, 2008 for European Patent Application Serial No. EP 07 11 7619, 2 Pages.

* cited by examiner

*Primary Examiner*—Donnie L Crosland
(74) *Attorney, Agent, or Firm*—Amin Turocy & Calvin LLP; William R. Walbrun (57) ABSTRACT

An alarm generation system within an industrial automation environment comprises a packaging component that packages contextual data together with an alarm. A provision component relays the packaged contextual data and the alarm to an appropriate device. Thus, customized alarms can be provided for certain recipients given particular situations.

20 Claims, 11 Drawing Sheets

CUSTOMIZED INDUSTRIAL ALARMS

TECHNICAL FIELD

The subject invention relates generally to industrial control systems and, more particularly, to generating alarms in an industrial environment.

BACKGROUND

Due to advances in computing technology, businesses today are able to operate more efficiently when compared to substantially similar businesses only a few years ago. For example, networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, drive actuators, respond to data in real-time, and other various procedures that relate to automating a process.

In conventional industrial environments, alarms are generated when a process variable lies outside a threshold range and/or when an operator undertakes a certain action (such as depressing an emergency stop push-button). Additionally, these alarms are often created within a higher-level system, such as a manufacturing execution system (MES), and not by devices on a factory floor. Thus, alarms can be associated with unnecessary delays and can be difficult to reconcile if they originate from different but related devices. Once the alarms are generated, they are delivered to pre-defined recipients in a "cookie-cutter" manner. Thus, each recipient receives an identical alarm. More particularly, an executive would receive an alarm identical to an alarm received by an operator.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates to robust alarm management and delivery of customized alarms to an individual or device. In more detail, an alarm and associated metadata can be packaged and sent to an appropriate device or user based at least in part upon contextual data, device parameters, and/or user characteristics. For example, an event may occur that warrants an alarm. A field device and/or a controller can analyze current contextual data, device parameters, and/or user characteristics and package the alarm with metadata that relates to the aforementioned contextual data, device parameters, and/or user characteristics. A few examples of metadata include time of day, day of week, time of year (which can be resident within a time stamp), geographic location, location within an industrial environment relative to a particular piece of equipment or region, equipment type, cause of the alarm, type of failed or stalled equipment, temperature, position, velocity, acceleration, and other such related data. The metadata may be maintained within one or more data repositories and accessed by a controller generating an alarm or by a field device. The information related to the alarm can be received and analyzed to determine an appropriate recipient and to tailor the alarm accordingly. The alarm can then be relayed to an appropriate recipient. Additionally, metadata can include data relating to Enterprise Resource Planning (ERP) systems, such as order number, product number, serial number, lot code, customer name, and other suitable information relating to goods/products being manufactured (and not solely metadata relating to devices that produce goods). Accordingly, alarms and/or events can be associated with order numbers and the like.

In an example, prior to an alarm being packaged, one or more desired recipients from amongst a plurality of possible recipients can be identified. This can be accomplished by identifying candidate users or devices, determining permissions, abilities, employment level, status, location, appropriate level of attention, and other parameters such as whether there are other devices or processes that may be affected by the situation, etc.

Additionally or alternatively, the type and format of the alarm can be assessed when determining how to package the alarm. For example, if a recipient user is associated with a graphical user interface that has limited display space and low resolution, the alarm can be customized for optimal display on such a graphical user interface. In contrast, if an intended recipient is utilizing a graphical user interface with a robust display with high resolution and large screen real estate, then the alarm can be packaged so a significant amount of detail is provided in an aesthetically pleasing manner. Similarly, if the recipient is a device, the alarm may comprise machine readable code, whereas if the recipient is a user, visible symbols and/or human legible characters are appropriate.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Figure 1:
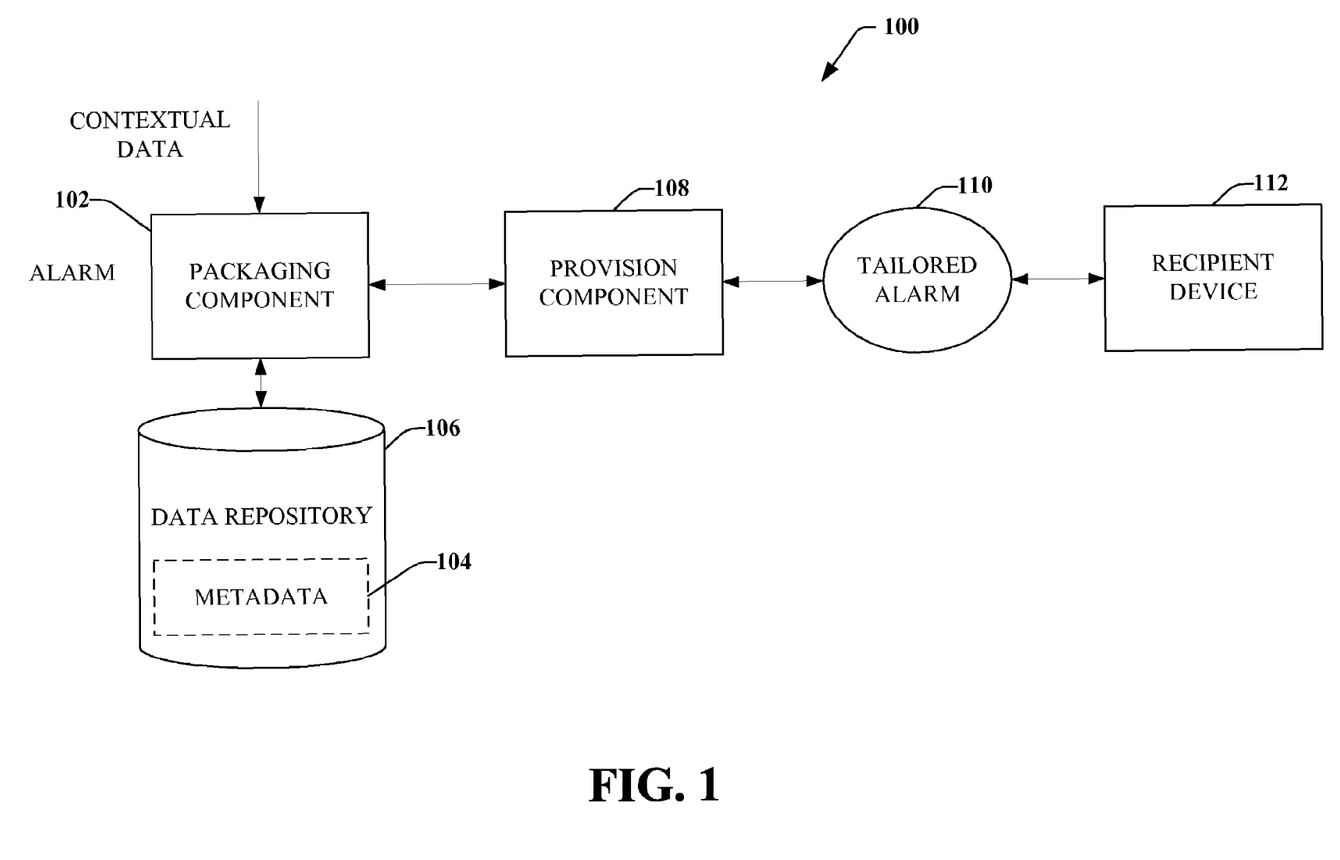
FIG. 1 illustrates a system that generates an alarm within an industrial automation environment.

Now referring to the drawings, FIG. 1 illustrates a system 100 that generates an alarm within an industrial automation environment. The system 100 includes a packaging component 102 that can receive an alarm and contextual data that may be associated with an event that causes the alarm. For instance, the contextual data can include sensed parameters relating to an event or alarm, such as position of a device, velocity and/or acceleration associated with a moving unit, temperature, stress, strain, time of alarm, current time of day, day of week, whether a day is a holiday, a weekend, geographic location of an event, presence of workers, number and location of potentially affected machines, operators associated with an event, location of operators, operator preferences, etc.

The packaging component 102 can access metadata 104 stored in a data repository 106 based at least in part upon the received contextual data. The metadata 104 can relate to an intended recipient, and can include information relating to user role, permissions, experience, training, whether the recipient is a device or a user, display device characteristics, instructions relating to an alarm, etc. The metadata can also include information associated with Enterprise Resource Planning (ERP) systems, such as order number, serial number, product number, lot code, customer name, and other suitable information relating to goods/products being manufactured. Therefore, alarms can be searched over based upon customer identity, lot number, and other suitable "higher-level" information. The packaging component 102 can use the metadata 104 to tailor the alarm in accordance with recipient preferences/parameters. For example, the packaging component 102 can determine severity of an alarm, and can package the alarm such that a recipient of the alarm can discern that the alarm is associated with a particular priority. As an example, the metadata 104 can be utilized by the packaging component 102 to create graphics (such as a red exclamation point) that are provided to an operator to indicate that the alarm is associated with a high level of priority.

The system 100 additionally includes a provision component 108 that can provide a tailored alarm 110 to an intended recipient device 112. Also, the packaging component 102 and the provision component 108 can operate in conjunction to deliver several customized alarms to various intended recipients, wherein the alarms can be based upon a substantially similar event. Pursuant to an example, a controller can detect that a pump has stopped operating (through analysis of sensor outputs), and an alarm can be provided to the packaging component 102. The packaging component 102 can review contextual data, such as time of day, and thereafter access the data repository 106 to retrieve metadata associated with the contextual data. The metadata can indicate that two separate operators should receive the alarm, but in different formats. The packaging component 102 can package the alarms accordingly, and can provide such alarms to the provision component 108. In turn, the provision component 108 can relay the tailored alarms (in different formats) to the two operators. The packaging component 102 may also format the alarm 110 according to requirements associated with the device 112. For example, if the device 112 is a hand-held device with a small black and white display, the alarm may be delivered such that content is clearly displayed to a user of the device 112. In contrast, if the recipient device 112 has a significant amount of screen space/size, high resolution, and many colors, the alarm 110 can be tailored to provide more granular information, including graphics, color schemes, and the like.

In another example, during a manufacturing process a welding machine may overheat. Contextual information 104 relating to the situation can be collected and compiled, including current temperature of the machine, a safe temperature range in which the machine normally operates, location of the machine, a product the machine is welding, properties of the product such as heat sensitivity and cost, and so forth. This information can be relayed to the packaging component 102, which can store the information in a data repository for later usage and/or utilize the contextual information to access appropriate metadata from within the data repository 106. The packaging component 102 can then access the metadata 104 and determine that a temperature of the welding machine is cause for an alarm and indicate to a user that the situation is severe (e.g., because the product has a high heat sensitivity and is likely to be damaged by high temperatures or the temperature is outside a normal temperature range). Therefore, the alarm may require the attention of maintenance personnel as well as an operator. The packaging component 102 can utilize the metadata 104 to locate an appropriate operator and identify that a desired operator is carrying a hand held device with a small black and white screen. The alarm is then tailored by the packaging component 102 according to the user, the urgency, the screen of the hand held device 112, user preferences, and/or various other factors. The provision component 108 can then selectively deliver the tailored alarm 110 to the operator as well as to maintenance personnel (in a manner customized for the maintenance personnel).

In another example, the packaging component 102 can determine from the contextual data and the received alarm that a welding machine (due to temperature fluctuations) will be offline for a substantial amount of time and that a product that is being produced through use of the machine is associated with a hard delivery deadline. It may be desirable, therefore, to inform a senior plant manager, various maintenance personnel, as well as the chief executive officer of the company. The tailored alarm 110 can be packaged and delivered to the plant manager and CEO simultaneously but in formats specific to each individual. For instance, the plant manager may be on site and receive a call on a cell phone or pager while the CEO may be in another country and receive an email.

Figure 2:
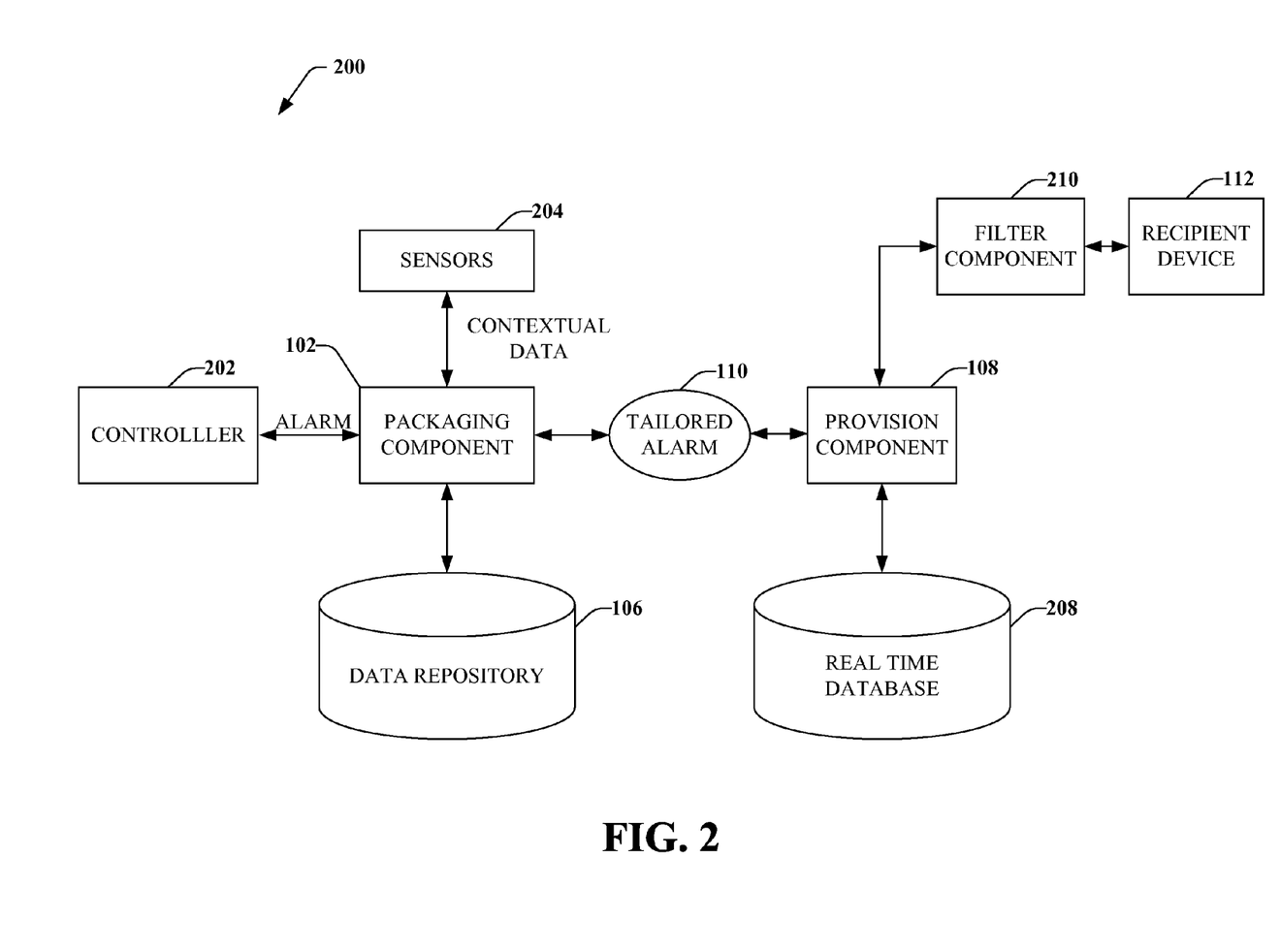
FIG. 2 illustrates a system that generates an alarm in which an alarm and contextual data are packaged and delivered to an intended recipient.

Turning now to FIG. 2, a system 200 for generating an alarm in which an alarm and contextual data are packaged and delivered to an intended recipient is illustrated. The system 200 includes a controller 202 that can generate an alarm in response to an event or a non-event, such as receipt of user input, sensed alterations in conditions, etc. For example, the controller 202 can be a logic controller, a robotic controller, and/or the like. The system 200 additionally includes sensors 204 that capture contextual data pertaining to the alarm 102, such as temperature, time of day, day of week, shift, and other suitable contextual data. The controller 202 and the sensors 204 deliver the alarm and contextual data, respectively, to the packaging component 102. The packaging component 102 can be configured to retain data pertaining to the alarm, including contextual data, in the data repository 106, which may serve to back up the information for later utilization (e.g., for analysis through machine-learning techniques). For example, retention of alarms and contextual data associated therewith can enable discernment of patterns, trends, and/or the like associated with certain alarms at particular times. Additionally, the data within the data depository 106 can be analyzed to enhance preventative maintenance techniques, locate operators who are habitually associated with alarms (for subsequent training), etc.

The tailored alarm 110 can be passed to the provision component 108, which can be utilized to provide the alarm 110 to an intended recipient. The provision component 108 can access a real-time database 208, which can include metadata pertaining to real-time conditions of the recipient device 112. This information can comprise physical whereabouts of the recipient device 112, type of device 112, user associated with the device 112, preferred methods of communication with respect to the user, etc. The alarm 110 can then be relayed to a filter component 210, which filters the alarm 110 according to the metadata and the recipient device 112 to produce an alarm that is not associated with superfluous data. Thus, a recipient will not be burdened with unnecessary information and traffic over an industrial automation network can be reduced.

Figure 3:
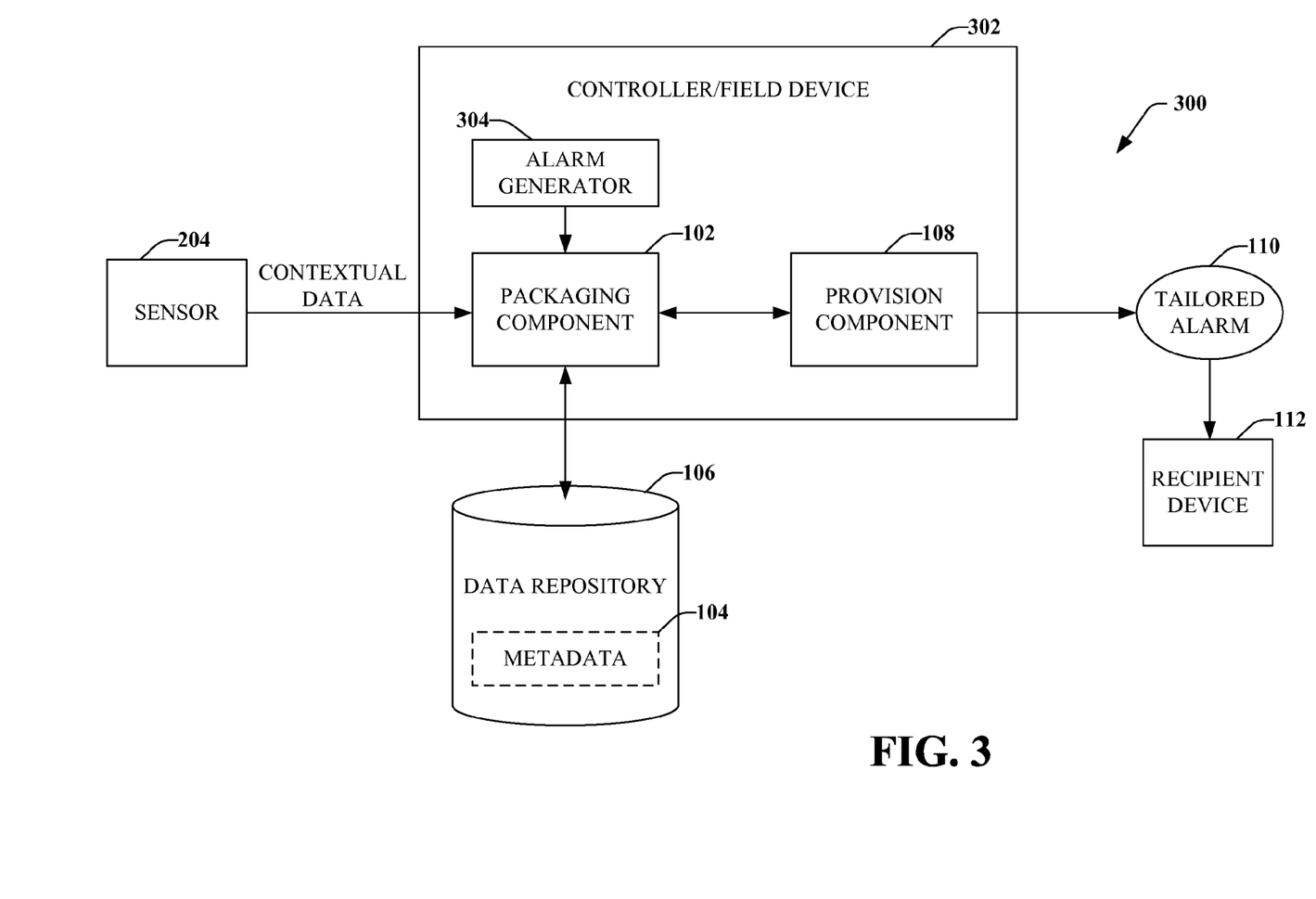
FIG. 3 illustrates an example industrial controller or field device.

Turning now to FIG. 3, a system 300 for generating an alarm within a controller or field device is illustrated. The system 300 includes a controller/field device 302, which can be a programmable logic controller, a robotic controller, and/or any other suitable controller. The controller/field device 302 can also be a factory floor device, such as a pump, a press, a drill, or other suitable device. The controller/field device 302 includes an alarm generator 304, which can generate an alarm upon occurrence of a certain event or lack of occurrence of an event. The controller/field device 302 additionally includes the packaging component 102 and the provision component 108.

The alarm generator 304 is communicatively coupled to the packaging component 102, and relays a created alarm thereto. Upon receipt of an alarm, the packaging component 102 can receive contextual data from the sensors 204. The packaging component 102 can exchange information with the data repository 106 to store alarm information and to access metadata 104 and tailor the alarm as described above. The provision component 108 can then deliver the tailored alarm 110 to the appropriate device 112. Additionally, while shown as being external to the controller/field device 302, it is understood that the data repository 106 can be retained within the controller/field device 302. In another example, the data repository 206 can be located centrally by way of a network, such that several controllers and/or field devices can easily access the metadata 104 (and other contents of the data repository 106).

Figure 4:
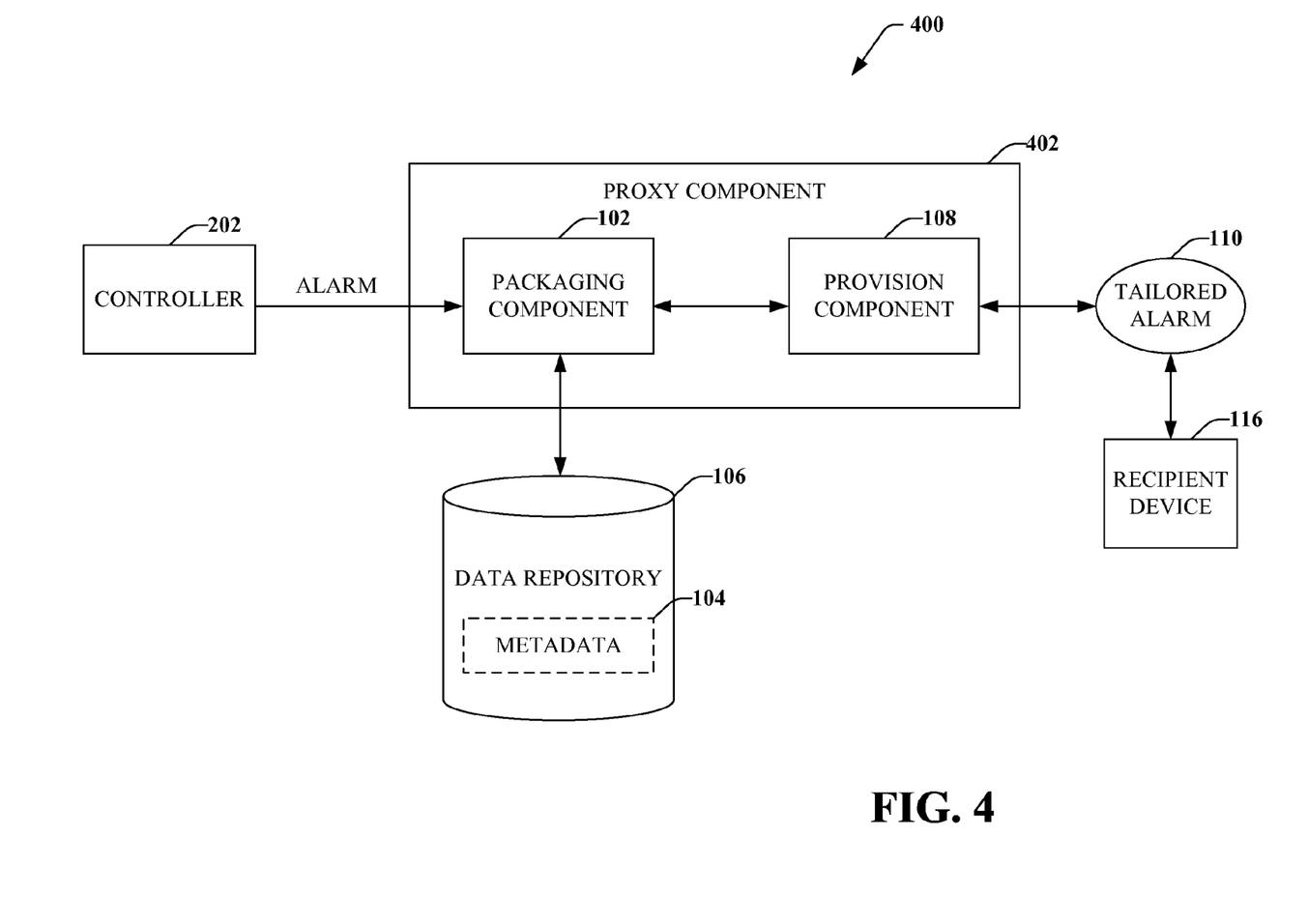
FIG. 4 illustrates an example proxy component that can customize alarms created by legacy controllers.

Turning now to FIG. 4, a system 400 for generating an alarm is illustrated. The system 400 includes the controller 202, which can generate an alarm and/or provide data that causes generation of an alarm. The system 400 additionally includes a proxy component 402, which can receive the alarm and/or data that causes creation of an alarm from the controller 202. Thus, the proxy component 402 can be tasked with creating an alarm therein (e.g., the proxy component 402 can include the alarm generator 304). The packaging component 102 receives the alarm and contextual data associated therewith. The packaging component 102 can access the metadata 104 within the data repository 106, and generate a customized alarm. The provision component 108 receives such alarm and provides it to the appropriate device 112 (from amongst several possible devices).

The proxy component 402 can be utilized in instances that the controller 202 is a legacy controller (and thus may not have capabilities relating to alarm generation and packaging). For example, it can be quite expensive for a manufacturer to replace each existing controller in a factory with a controller that can perform the functionality described herein. Additionally, the controller 202 may perform core functionality adequately, rendering it undesirable to immediately replace such controller 202. Accordingly, the proxy component 402, which can be an additional piece of hardware, can be utilized such that the controller 202 and the proxy component 402 act as a single logical entity. Still further, the proxy component 402 can provide functionality to several different controllers at a single instance in time. Pursuant to an example, the proxy component 402 can be placed on a network where it can communicate with several controllers, such as within or at a router, a switch, a gateway, and/or the like.

Still further, while the data repository 106 is shown as being external to the proxy component 402, it is understood that such repository 106 can be retained within the proxy component 402. Additionally, the data repository 106 can be positioned such that several controllers and/or proxy components can access the data repository 106 and the metadata 104 retained therein.

Figure 5:
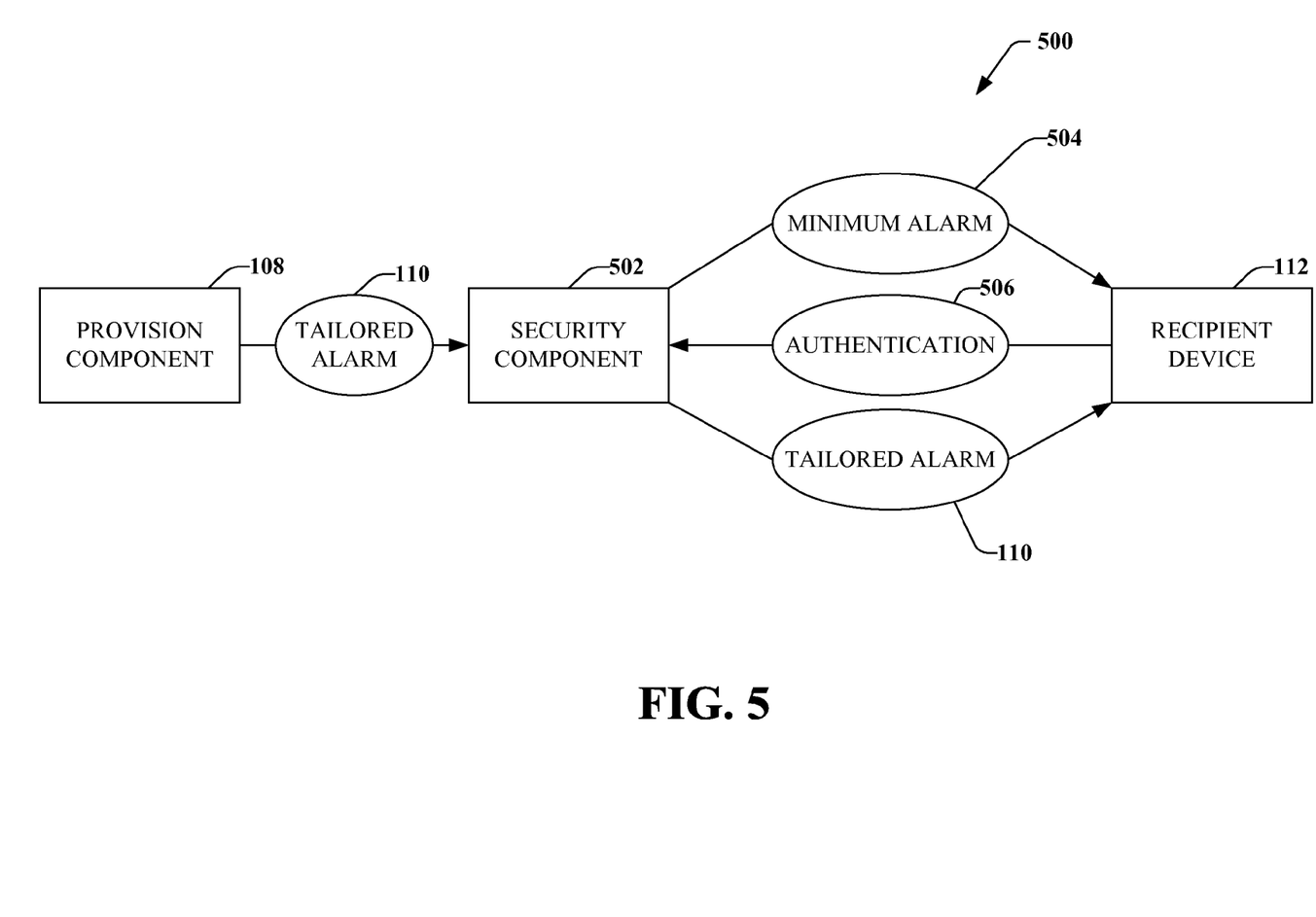
FIG. 5 illustrates a system that facilitates provision of a tailored alarm to a device.

Turning now to FIG. 5, a system that provides a tailored alarm to a particular device is illustrated. The system 500 includes the provision component 108, which delivers the tailored alarm 110 to a security component 502. The security component 502 can be utilized to analyze alarm information and reduce provision of sensitive information to unauthorized parties. The security component 502 can provide to an intended recipient a minimum alarm 504 which may contain a minimum or "bare bones" amount of information relating to the alarm so as to communicate the occurrence of an alarm without sacrificing security or disclosing sensitive information. The minimum alarm 504 can also include a request for authentication 506 from a user of the device 112. For example, such request for authentication can include a request for a username, password, personal identification number, biometric indicia (such as a voice sample, fingerprint sample), and any other suitable information that can be utilized to identify a user for authentication purposes. Moreover, the request for authentication can relate to a location of the user. For instance, it would not be desirably to send a user sensitive alarm information if the user was in a location where the information could easily become public.

For example, the provision component 108 can be provided with instructions from the packaging component 102 (FIG. 1) to deliver an alarm to the device 112, wherein the device 112 is a public terminal. The security component 502 can cause the alarm to be broadcast at the public terminal, while preventing sensitive information from being disclosed to unintended parties. Additionally, when there is an alarm, a manager may be granted permissions at such a public terminal that lower level workers do not have. The security component 502 enables the manager to perform necessary action to resolve the alarm without compromising security. Other possible threats are hackers, viruses, and other malicious code. The security component 502 can be configured to thwart these threats.

In another example, the security component 502 can restrict access to metadata 104 (FIG. 1) retained within the data repository 106. Pursuant to an example, a malicious individual may want to compromise security associated with generation of a consumable, such as a drug. Therefore, the malicious individual may wish to access and alter metadata such as to cause an alarm to not be provided to an appropriate party. The security component 502 can log accesses to the metadata 104, can request authentication information, can utilize public/private key pairs to ensure that a requesting entity is authorized to access the metadata 104, etc.

Figure 6:
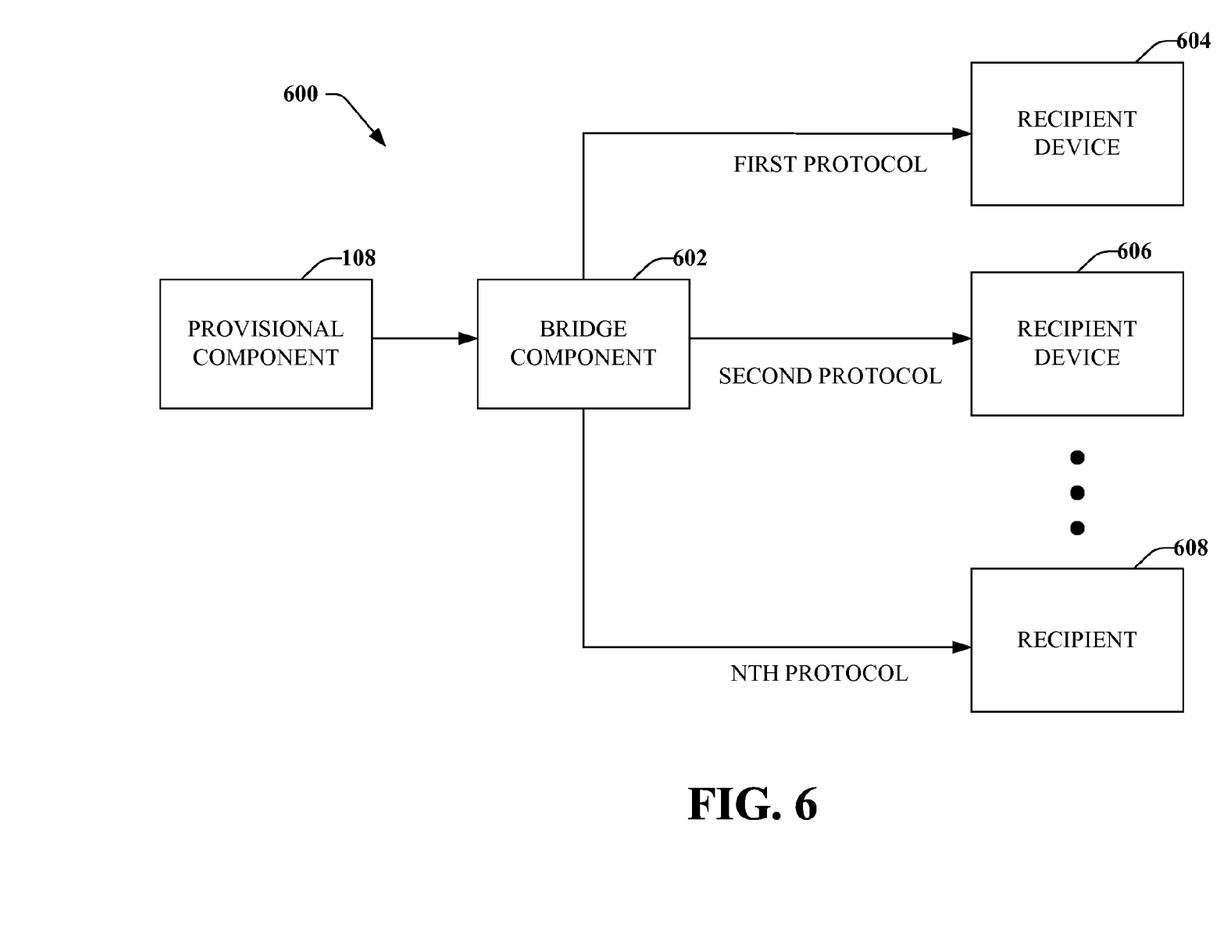
FIG. 6 illustrates a system that facilitates altering format of an alarm to accord to a particular communications protocol.

Turning now to FIG. 6, a system 600 that can provide alarms over various industrial automation communications protocols is illustrated. The system 600 includes the provision component 108 that, as described above, can relay an alarm to an intended recipient device. The system 600, however, illustrates that intended recipient devices can be associated with different communications protocols, such as the Control and Information Protocol (CIP), DeviceNet, ControlNet, Ether-NetIP, Profibus, Hart, Foundation Fieldbus, and/or other suitable protocols. In more detail, it is common for a manufacturing operation to employ equipment produced by a varied group of manufacturers, and equipment from each manufacturer may be associated with particular protocols, which may not be compatible with protocols used by other equipment.

The system 600 includes a bridge component 602 that receives an alarm from the provision component 108 and formats the alarm according to a protocol associated with the intended recipient device. The information is then passed to an appropriate device (one of devices 604-608) according to the correct communication protocol.

Figure 7:
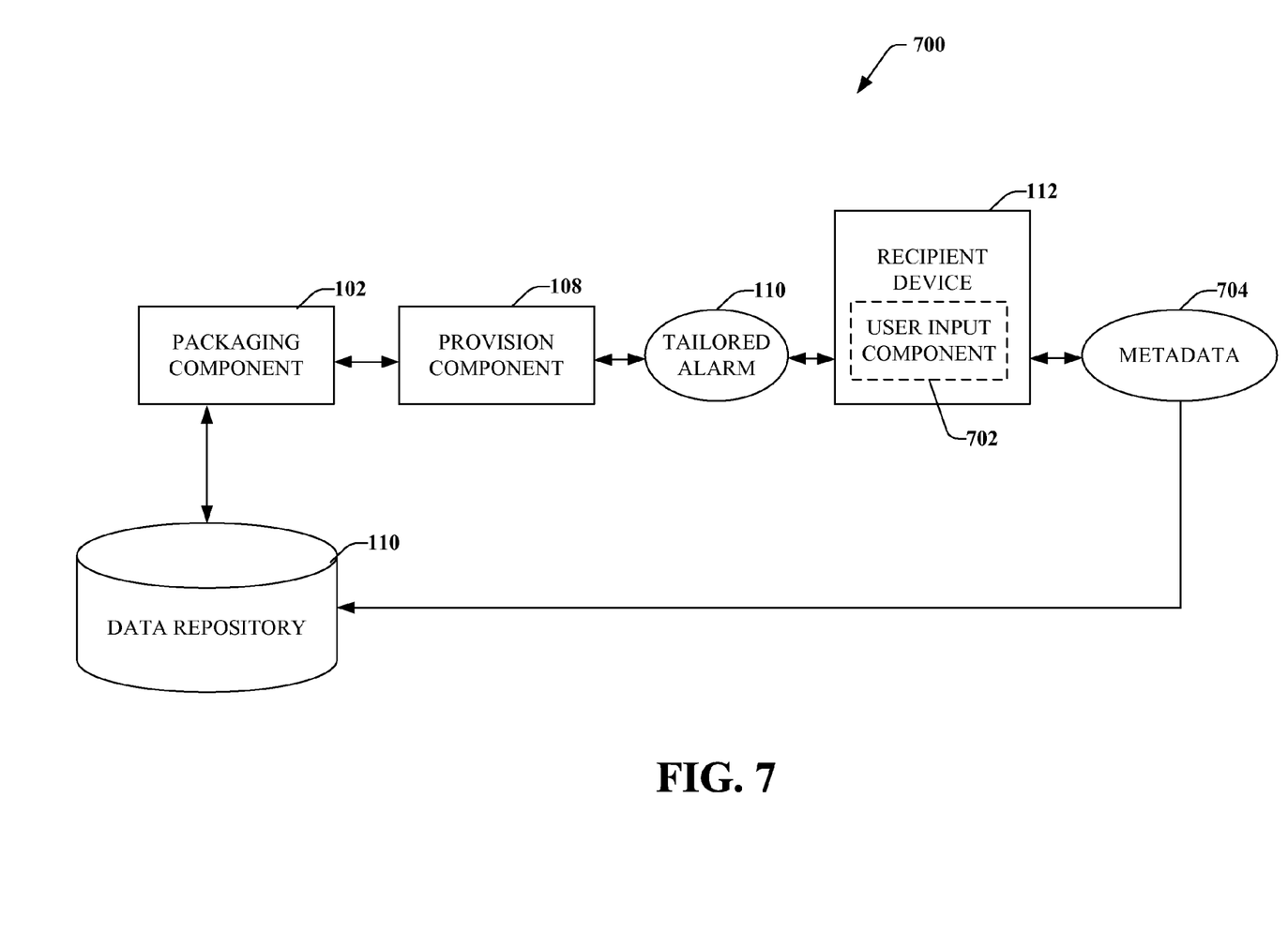
FIG. 7 illustrates a system that facilitates providing an alarm to a device according to user input.

Turning now to FIG. 7, a system that packages an alarm, provides the alarm to a device, and updates the alarm with user input is illustrated. The system 700 includes the packaging component 102, which can operate as described above in conjunction with the provision component 108, which delivers the tailored alarm 110 to the device 112. In an example, the device 112 can include a user input component 702, which allows a user to append additional information to the alarm 110 and provide it back to the packaging component 102 for deliverance to another device. Information appended to the alarm may relate to the alarm itself, a method of delivery, employee characteristics, or other suitable information. In another example, the user input component 702 can be employed in connection with relaying the alarm to another device. For example, an operator may believe that contents of the alarm are important with respect to an adjacent manufacturing line, and can cause the alarm 110 to be forwarded to one or more operators associated with the adjacent line. Furthermore, the user input component 702 can be utilized to inform a monitoring component (not shown) that the intended user has reviewed the alarm. For instance, if the intended user does not indicate receipt of the alarm within a certain time window through use of the user input component 702, the provision component 106 can relay the alarm to another individual, resend the alarm to a different device associated with the user, etc.

By way of a specific example, the packaging component 102 can package the alarm 110 such that it is delivered to a senior plant manager because the manager has the necessary permissions to view and address the alarm 110. An employee may also be associated with requisite permissions, but the system 700 has not been updated with such knowledge. The senior level manager can provide such an update by way of the user input component 702, thereby creating additional metadata 704. The metadata 704 can be retained within the data repository 106. Therefore, when the packaging component 102 subsequently generates an alarm associated with the aforementioned restrictions, the provision component 106 can deliver the alarm to the promoted employee.

Figure 8:
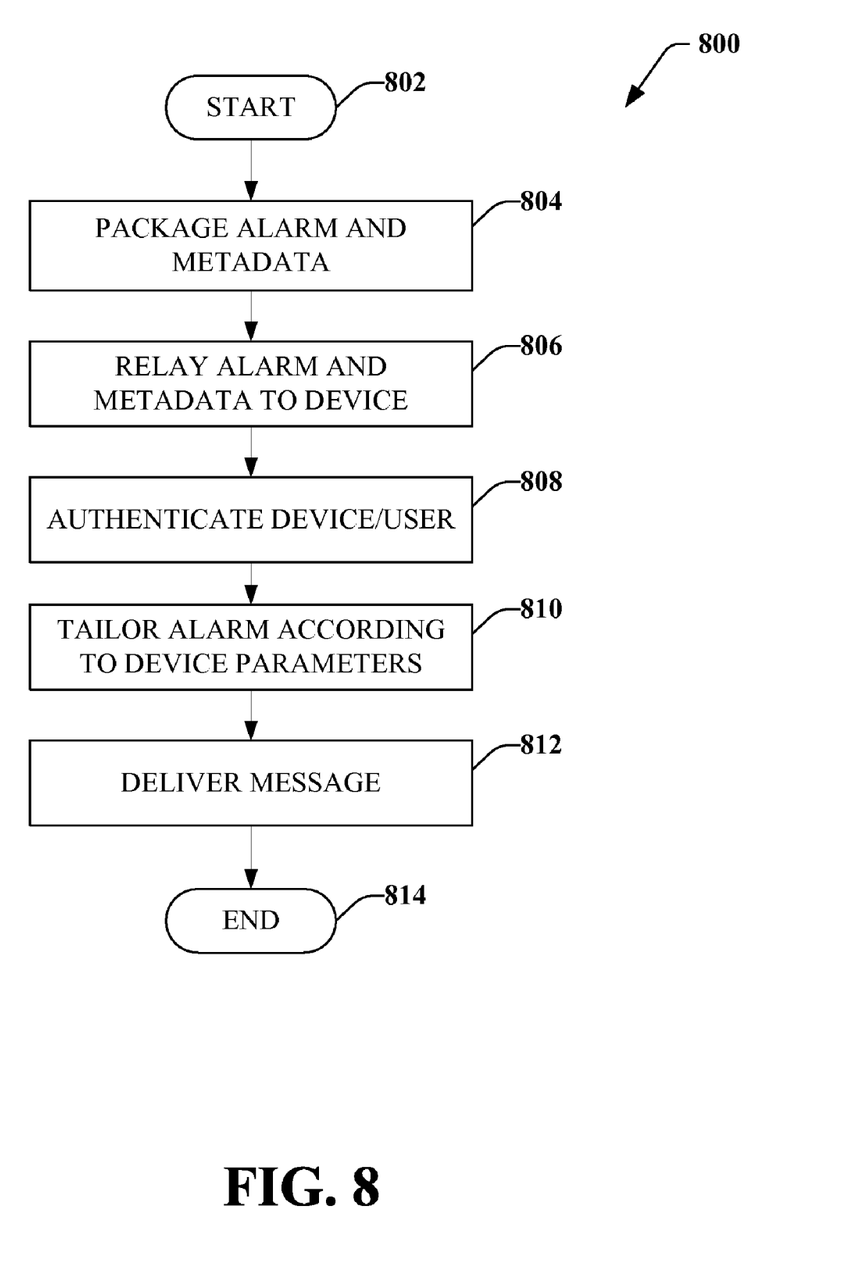
FIG. 8 is a representative flow diagram illustrating a methodology for delivering a customized alarm to an intended recipient.
Figure 9:
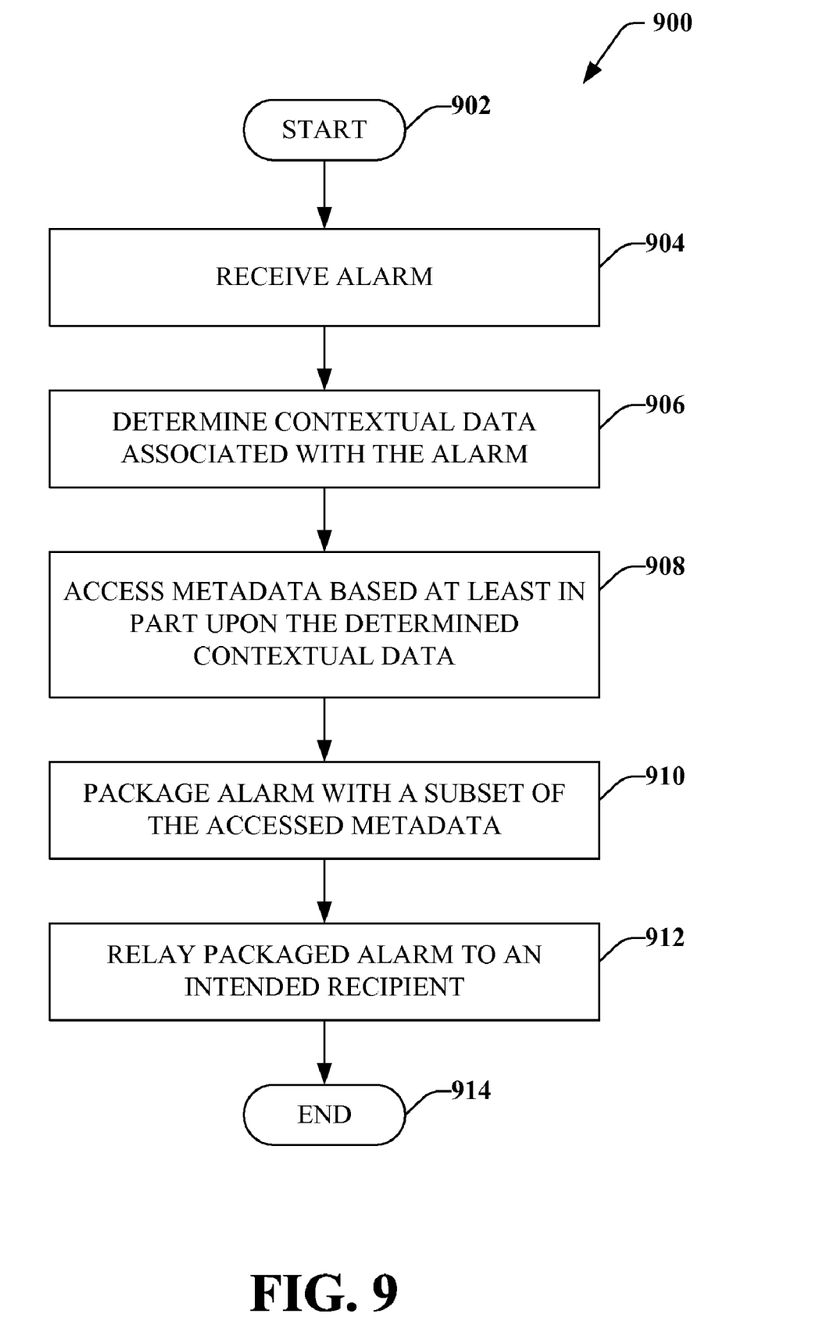
FIG. 9 is a representative flow diagram illustrating a methodology for delivering a tailored alarm to an intended recipient

Referring to FIGS. 8 and 9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of inter-related states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 8, a methodology 800 for delivering a tailored alarm to an intended recipient is illustrated. The methodology 800 initiates at 802, and at 804 an alarm is packaged together with metadata describing the alarm. For instance, the metadata can relate to display preferences, device parameters, details relating to an amount of information that should be provided to a particular user, etc. Prior to packaging, the alarm and metadata may be in the form of raw data (which can indicate that a problem exists but lack details relating to a type of problem, how to correct a problem, etc.). At 806, once the alarm has been organized and packaged, and the recipient identified, the alarm and associated metadata is relayed to the intended recipient device. For instance, the intended recipient device can be an HMI terminal, a personal digital assistant (PDA), a mobile phone, a laptop computer, and/or the like. At 808, the recipient device and/or a user associated therewith is authenticated to enable receipt of the alarm information. Authentication ensures that critical alarm information is not delivered to unintended parties.

The device receiving the alarm may be any type of commonly encountered communication device, such as a cell phone, PDA, workstation, beeper, or PA system, etc. The device receiving the alarm may simply be an automated device which will take action without user input. At 810, the alarm can be tailored according to the parameters relating to the device. For example, if the device is a cell phone, the alarm may take the form of a call to the phone or a text message. In another example, if the device is an industrial automation device, the alarm may include only machine readable code. At 812, the tailored message is delivered. The device may then take appropriate action to resolve the circumstances which gave rise to the alarm. The methodology then completes at 814.

Turning now to FIG. 9, a representative flow diagram illustrating a methodology 900 for delivering a tailored alarm to an intended recipient is illustrated. The methodology 900 starts at 902, and at 904 an alarm is received. The alarm can be associated with contextual data, for instance, such as time, day of week, operator associated with the alarm, and/or the like. At 906, contextual data can be determined in combination with the alarm, including temperature, time of day, shift, and other suitable information. At 908 metadata which may pertain to a recipient device or user is accessed. The metadata accessed can be based at least in part upon the contextual data. For example, if the contextual data indicated that the alarm arose in a particular sector of a plant, then the metadata accessed may relate to devices and/or personnel located in or near the particular sector. At 910, the alarm can be packaged with at least a subset of the metadata. The subset may be the portion determined most relevant according to the contextual data. At this point the alarm has been tailored for effective delivery. At 172 the alarm is delivered to an intended recipient (and customized according to the recipient's identity, for instance).

Figure 10:
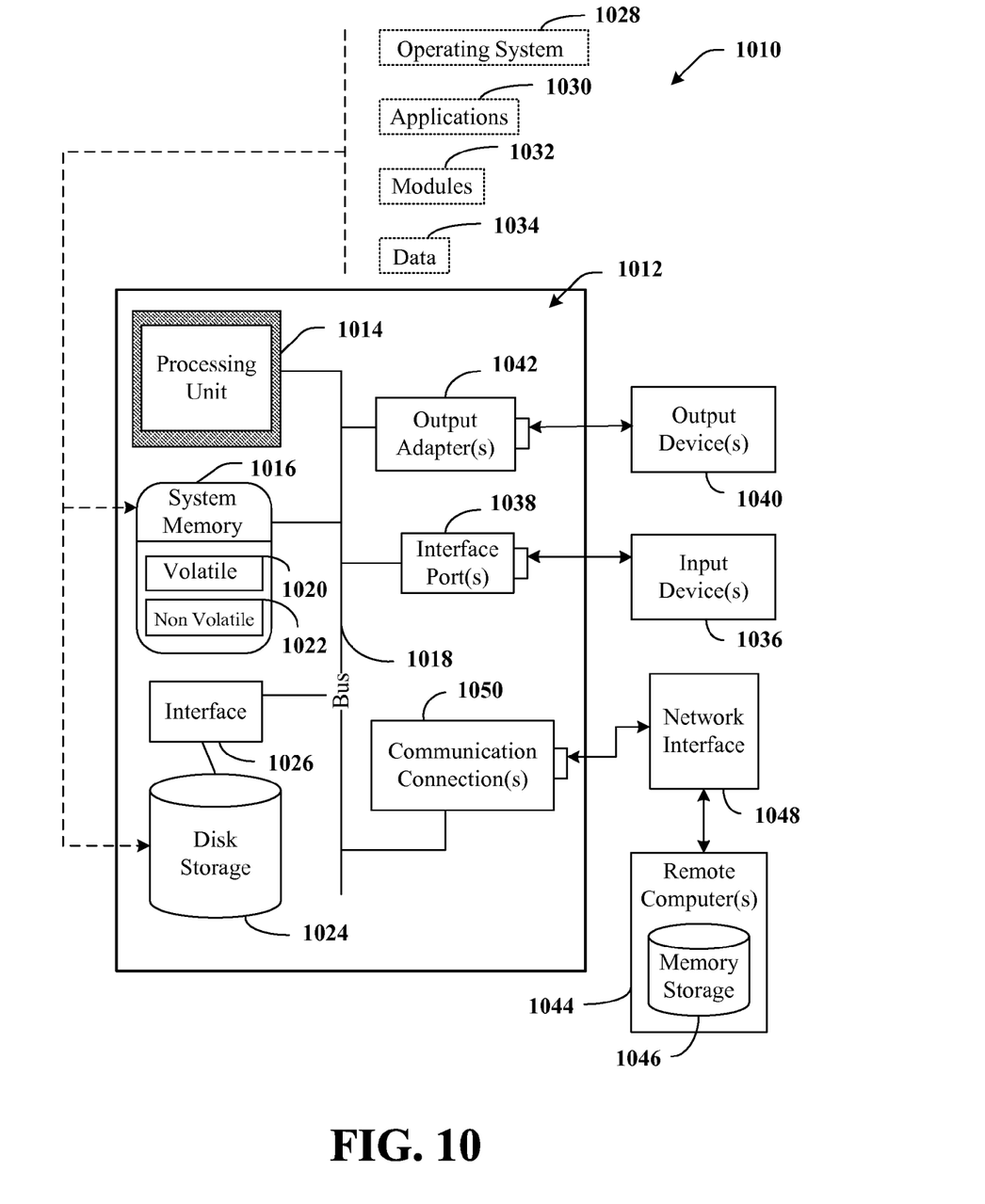
FIG. 10 is an example computing environment.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

Figure 11:
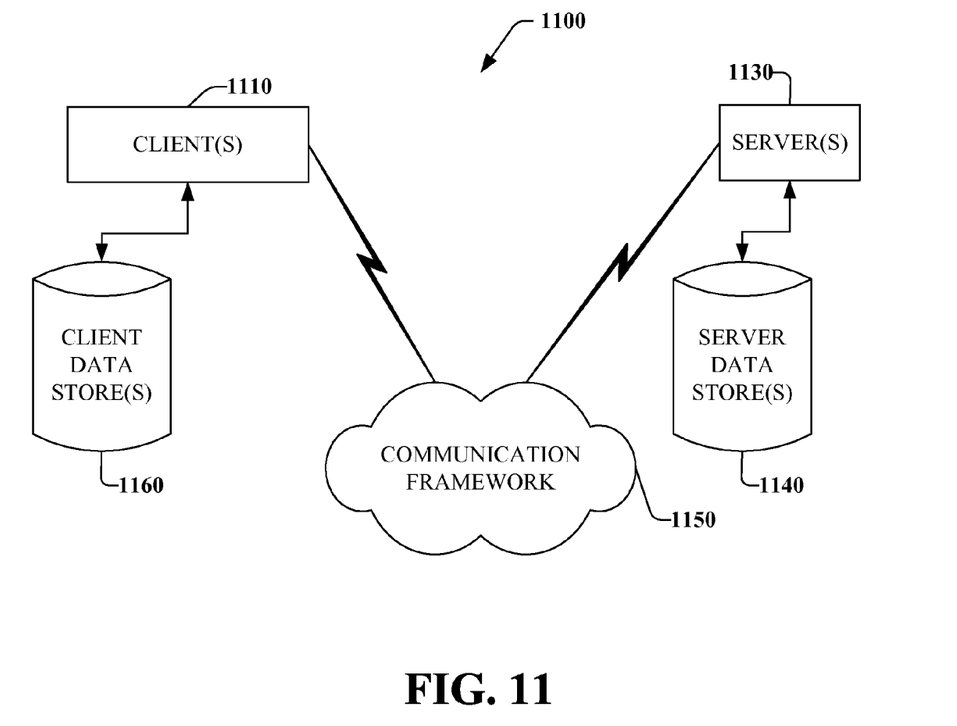
FIG. 11 is an example computing configuration.

FIG. 11 is a schematic block diagram of a sample-computing environment 1100 with which the subject invention can interact. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the subject invention, for example. One possible communication between a client 1110 and a server 1130 can be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An alarm generation system within an industrial automation environment for providing customized alarms to an intended recipient device, comprising:
   a packaging component that packages contextual data together with an alarm;
   a provision component that relays the packaged contextual data and the alarm to an appropriate device; and
   a real-time database that includes metadata pertaining to real-time conditions of the appropriate device, the real-time conditions include one or more of an identity of a user associated with the device and preferred method of communication with respect to the user.

2. The system of claim 1, an industrial controller comprises the packaging component and the provision component.

3. The system of claim 1, the industrial controller is one of a logic controller and a robotic controller.

4. The system of claim 1, further comprising a data repository that retains data relating to the alarm, the packaging component accesses the data repository and packages data within the data repository within the alarm as metadata.

5. The system of claim 4, data within the data repository is indicative of an identity of the appropriate device.

6. The system of claim 4, the metadata includes data relating to an Enterprise Resource Planning system.

7. The system of claim 1, further comprising a filter component that analyzes metadata associated with the alarm and selectively reduces size of the alarm based at least in part upon the analysis.

8. The system of claim 1, a field device comprises the packaging component and the provision component.

9. The system of claim 1, a proxy device comprises the packaging component and the provision component, the proxy device is communicatively coupled to a legacy controller.

10. The system of claim 1, further comprising a security component that authenticates an identity of a user prior to enabling the provision component to provide the user with an alarm.

11. The system of claim 10, content of the alarm is a function of geographic location of the user as determined by the security component.

12. The system of claim 10, the security component analyzes one or more of a username, a password, a personal identification number, and biometric indicia in connection with authenticating the identity of the user.

13. The system of claim 1, further comprising a bridge component that reformats an alarm from being in accordance with a first protocol to a second protocol.

14. The system of claim 1, the packaging component updates configuration of an alarm as a function of previously received user input.

15. A method for providing customized alarms to devices, comprising:
   packaging an alarm relating to an industrial process together with metadata that describes the alarm; and
   providing the alarm and the metadata packaged therewith to an intended recipient, and determining real-time conditions of the intended recipient from a real-time database, the real-time conditions include one or more of an identity of a user associated with the device and preferred method of communication with respect to the user.

16. The method of claim 15, further comprising:

authenticating an identity of the intended recipient; and customizing content of the alarm based at least in part upon the identity.

17. The method of claim 15, further comprising reformatting the alarm based at least in part upon the identity of the intended recipient.

18. The method of claim 15, further comprising:

receiving contextual data; and selecting metadata to package with the alarm based at least in part upon the received contextual data.

19. The method of claim 15, further comprising:

analyzing previously provided user input; and formatting the alarm based at least in part upon the analysis.

20. A field device configured to perform the method of claim 15.

* * * * *